United States Patent
Schroers et al.

(10) Patent No.: US 10,124,391 B1
(45) Date of Patent: Nov. 13, 2018

(54) PROPERTY ENABLED FEATURE INTEGRATION STRATEGIES AND THEIR FABRICATION METHODS FOR METALLIC GLASSES

(71) Applicant: Yale University, New Haven, CT (US)

(72) Inventors: Jan Schroers, Hamden, CT (US); Thomas MacKenzie Hodges, North Haven, CT (US); Golden Kumar, Lubbock, TX (US); Rodrigo Miguel Ojeda Mota, New Haven, CT (US)

(73) Assignee: Yale University, New Haven, CT (US)

( * ) Notice: Subject to any disclaimer, the term of this patent is extended or adjusted under 35 U.S.C. 154(b) by 616 days.

(21) Appl. No.: 14/255,205

(22) Filed: Apr. 17, 2014

Related U.S. Application Data

(60) Provisional application No. 61/813,397, filed on Apr. 18, 2013.

(51) Int. Cl.
*H01H 1/02* (2006.01)
*B21D 26/055* (2011.01)

(52) U.S. Cl.
CPC ............ *B21D 26/055* (2013.01); *H01H 1/02* (2013.01); *Y10T 428/12201* (2015.01)

(58) Field of Classification Search
CPC ............ H03K 17/965; H03K 17/9651; H01H 2211/032
See application file for complete search history.

(56) References Cited

U.S. PATENT DOCUMENTS

| | | |
|---|---|---|
| 7,906,219 B2 | 3/2011 | Ohara et al. |
| 2011/0056301 A1 | 3/2011 | Winkler et al. |
| 2012/0103478 A1 | 5/2012 | Johnson et al. |
| 2014/0008999 A1 | 1/2014 | Prest et al. |
| 2014/0009215 A1 | 1/2014 | Prest et al. |
| 2014/0020794 A1 | 1/2014 | Hofmann et al. |

OTHER PUBLICATIONS

Schroers, J., et al., "Thermoplastic blow molding of metals," Materials Today, vol. 14, No. 1-2 (Jan.-Feb. 2011), pp. 14-19.
Sarac, B., et al., "Three-Dimensional Shell Fabrication Using Blow Molding of Bulk Metallic Glass," Journal of Microelectromechanical Systems, vol. 20, No. 1 (Feb. 2011), pp. 28-36.
Johnson, W. L., "Bulk Glass-Founing Metallic Alloys: Science and Technology," MRS Bulletin (Oct. 1999), pp. 42-56.
Pitt, E. B., et al., "Temperature dependence of the thermoplastic formability in bulk metallic glasses," AIP Journal of Applied Physics, 110, 043518 (2011), pp. 1-7.
Schroers, J., "Processing of Bulk Metallic Glass," Advanced Materials, vol. 22 (2010), pp. 1566-1597.
(Continued)

*Primary Examiner* — Adam Krupicka
(74) *Attorney, Agent, or Firm* — Carmody Torrance Sandak & Hennessey LLP

(57) ABSTRACT

An article comprising a bulk metallic glass skin having one or more functional features integrated therein is described and a method of forming the same is described. The one or more functional features exhibit a variation in stiffness between the one or more functional features and the bulk metallic glass skin that is defined by an applied force over an achieved deformation. The stiffness of each of the one or more functional features is at least 1000 times less than an average stiffness of the bulk metallic glass skin.

25 Claims, 17 Drawing Sheets

(56) References Cited

OTHER PUBLICATIONS

Schroers, J., "On the formability of bulk metallic glass in its supercooled liquid state," Acta Materialia, vol. 56 (2008), pp. 471-478.
Schroers, J., et al., "Blow molding of bulk metallic glass," Scripta Materialia, vol. 57 (2007), pp. 341-344.
Kato, H., et al., "Fragility and thermal stability of Pt- and Pd-based bulk glass forming liquids and their correlation with deformability," Scripta Materialia, vol. 54 (2006), pp. 2023-2027.
Inoue, A., "Stabilization of Metallic Supercooled Liquid and Bulk Amorphous Alloys," Acta Materialia, vol. 48 (2000), pp. 279-306.

PROPERTY ENABLED FEATURE INTEGRATION STRATEGIES AND THEIR FABRICATION METHODS FOR METALLIC GLASSES

CROSS REFERENCE TO RELATED APPLICATIONS

The present application claims the benefit of U.S. Provisional Application No. 61/813,397, filed on Apr. 18, 2013, the subject matter of which is herein incorporated by reference in its entirety.

FIELD OF THE INVENTION

The present invention relates generally to bulk metallic glass articles having functional features integrated therein and methods of making the same.

BACKGROUND OF THE INVENTION

For a wide range of applications it is beneficial to incorporate certain functional features such as keys, buttons, switches, sensors, keyboards, large stroke features (e.g., mechanical feedthroughs for vacuum systems), etc. into an article. It is also desirable for certain applications to integrate these functional features into the article itself. By "integrate" what is meant is that the article (or skin of the article) and the functional feature(s) are made of the same material and are continuously connected to each other.

However, it is currently not possible to integrate functional features into metal articles during fabrication because metal processing techniques are not capable of producing the thin sections that are necessary to achieve required stroke functionality (large deformation at low applied force) combined with thicker sections that provide structural integrity. Furthermore, conventional metals also exhibit limited elasticity, which further prohibits the integration of such functional features therein.

Thus, functional features such as keys, buttons, keyboards, and sensors typically comprise different materials for the functional feature(s) and for the skin materials that are not integrated into the article. In addition, functional features such as bellows and large stroke features typically require welding of the features to the article, which can result in leakage, provide breakage upon repeated use, provide minimal elasticity and may also be very expensive. In addition, it is believed that integrated features would work better than welded composites, because there are no weak spots resulting from the joining of two materials.

Bulk metallic glasses (BMGs), also known as bulk solidifying amorphous alloy compositions, are a class of amorphous metallic alloy materials that are regarded as prospective materials for a vast range of applications because of their superior properties such as high yield strength, large elastic strain limit, and high corrosion resistance. BMG forming compositions may be based on titanium, copper, iron, nickel, palladium, zirconium, gold, cerium, platinum, calcium, magnesium, among others and alone or in combination with each other.

BMGs are regarded as prospective materials for a vast range of applications because of their superior properties such as high yield strength, large elastic strain limit, and high corrosion resistance. A unique property of BMG is that they have a supercooled liquid region (SCLR), $\Delta T_{sc}$, which is a relative measure of the stability of the viscous liquid regime. The SCLR is defined by the temperature difference between the onset of crystallization, $T_x$, and the glass transition temperature, $T_g$ of the particular BMG alloy. These values can be conveniently determined by using standard calorimetric techniques such as DSC (Differential Scanning calorimetry) measurements at 20° C./min.

Superplastic forming (SPF) of an amorphous metal alloy involves heating it into the SCLR and forming it under an applied pressure. The method is similar to the processing of thermoplastics, where the formability, which is inversely proportional to the viscosity, increases with increasing temperature. In contrast to thermoplastics however, the highly viscous amorphous metal alloy is metastable and eventually crystallizes.

Crystallization of the amorphous metal alloy must be avoided for several reasons. First, it degrades the mechanical properties of the amorphous metal alloy. From a processing standpoint, crystallization limits the processing time for hot-forming operation because the flow in crystalline materials is order of magnitude higher than in the liquid amorphous metal alloy. Crystallization kinetics for various amorphous metal alloys allows processing times between minutes and hours in the described viscosity range. This makes the superplastic forming method a finely tunable process that can be performed at convenient time scales, enabling the net-shaping of complicated geometries. Since similar processing pressures and temperatures are used in the processing of thermoplastics, techniques used for thermoplastics, including compression molding, extrusion, blow molding, and injection molding have also been suggested for processing amorphous metal alloys as described, for example, in J. Schroers, "Processing of Bulk Metallic Glass," Adv. Mater. 22 (14), 1566-1597 (2010).

To form amorphous metal alloys using a thermoplastic forming process, the amorphous metal alloy must be in its amorphous state, which means that the feedstock must be processed so that the sample is cooled fast to avoid crystallization. During this step, the amorphous metal alloy is typically not formed into its final shape but is rather cast into simple geometries such as cylinders, plates, pellets, and powders. Thereafter, the amorphous metal alloy is hot formed by reheating the material into the supercooled liquid temperature region where the material is formed under isothermal conditions, such that the amorphous state relaxes into a highly viscous metastable liquid that can be formed under applied pressure. Under isothermal conditions, the formability of the amorphous metal alloy increases with increasing processing temperature. Thus, the highest isothermal formability can be achieved at the highest possible processing temperature, so long as crystallization can be avoided.

The ability of an amorphous metal alloy to be thermoplastically formed is described by its formability, a parameter which is directly related to the interplay between the temperature dependent viscosity and time for crystallization as described, for example, in J. Schroers, "On the Formability of Bulk Metallic Glass in its Supercooled Liquid State," Acta Mater. 56 (3), 471-478 (2008); H. Kato, T. Wada, M. Hasegawa, J. Saida, A. Inoue and H. S. Chen, "Fragility and Thermal Stability of Pt- and Pd-based Bulk Metallic Glass Forming Liquids and their Correlation with Deformability," Scripta Mater. 54 (12), 2023-2027 (2006); and E. B. Pitt, G. Kumar and J. Schroers, "Temperature Dependent Formability in Metallic Glasses," J. Appl. Phys. 110 (4) (2011). Crystallization has to be avoided during TPF of an amorphous metal alloy since it degrades the amorphous metal alloy's properties and retards its formability.

Therefore, the total time elapsed during TPF of the amorphous metal alloy must be shorter than the time to crystallization.

At room temperature, BMGs have a significantly larger elastic strain limit of ~2% than traditional metals, which typically have an elastic strain limit of less than about 0.4%. The high strength/modulus and elasticity/modulus of BMGs and the absence of intrinsic length scales as in crystalline metals of ~10-100 microns allows for the fabrication of thin sections that are also homogenous.

However current processing methods based on casting of the BMG do not allow one to fabricate locally thin sections with required predictability. This is because the thickness of an article is proportional to the cooling rate. Thus, the thin regions constrain the flow of the liquid metal into the cavity and, in addition, the liquid cools faster in these regions and becomes more viscous in the thin regions, which further increases flow resistance.

U.S. Pat. Pub. No. 2011/0056301 to Winkler et al., the subject matter of which is herein incorporated by reference in its entirety, describes the use of a bulk metallic glass in a pressure sensor. However, Winkler et al. does not describe any methods of integrating functional features having various desired attributes into the skin of the bulk metallic glass article.

U.S. Pat. Pub. No. 2014/0008999 to Prest et al., the subject matter of which is herein incorporated by reference in its entirety, describes pressure sensing systems comprising bulk-solidifying amorphous alloys and pressure-sensitive switches containing bulk solidifying amorphous alloys. Prest et al. notes that the bulk-solidifying amorphous alloys are capable of repeated deformation upon application of pressure. However, Prest et al. does not disclose fabrication methods of the bulk-solidifying amorphous alloys to make the pressure sensitive switches. Nor does Prest et al. describe integrating functional features into the skin of a bulk metallic glass article.

There remains a need in the art for a bulk metallic glass article having functional features integrated therein and methods of making the same that overcomes the deficiencies of the prior art.

SUMMARY OF THE INVENTION

It is an object of the present invention to provide a bulk metallic glass (BMG) article having functional features integrated therein.

It is another object of the present invention to provide a BMG article having localized thin sections therein.

It is still another object of the present invention to provide a means for creating localized thin sections in a BMG article in a predictable manner.

It is still another object of the present invention to provide a means for creating localized thin sections in a BMG article having controlled thickness.

It is still another object of the present invention to provide a means for creating localized thin sections in a BMG article having variations in thickness.

To that end, in one embodiment, the present invention relates generally to an article comprising a bulk metallic glass skin, wherein the bulk metallic glass skin comprises one or more functional features integrated therein, wherein the one or more functional features exhibit a variation in stiffness between the one or more functional features and the bulk metallic glass skin, wherein the variation in thickness is defined by an applied force over an achieved deformation, wherein the stiffness of each of the one or more functional features is at least 1000 times less than an average stiffness of the bulk metallic glass skin, and wherein stiffness and strokelength of the one or more functional features is controlled by design parameters as described herein.

In another embodiment, the present invention relates generally to a method of fabricating an article comprising a bulk metallic glass skin and one or more functional features integrated therein, the method comprising the steps of:

a) providing a bulk metallic glass skin; and b) locally thinning one or more portions of the bulk metallic glass skin to create one or more functional features therein;

wherein the one or more functional features exhibit a variation in stiffness between the one or more functional features and the bulk metallic glass skin;

wherein the variation in thickness is defined by an applied force over an achieved deformation, wherein the stiffness of each of the one or more functional features is at least 1000 times less than an average stiffness of the article.

DETAILED DESCRIPTION OF THE PREFERRED EMBODIMENTS

Figure 1A:
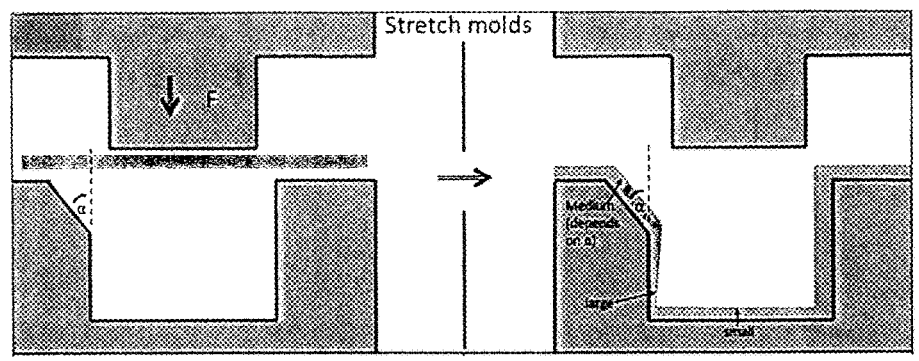
FIGS. 1A, 1B and 1C depict strategies to vary thicknesses of BMG articles.

The inventors of the present invention have surprisingly discovered that functional features can be integrated into a BMG article or the skin of a BMG article based on the principles of controlled thermoplastic forming of BMGs. BMGs allow for the fabrication of thin sections because they are homogenous down to the nanometer length scale and do not comprise crystals (~50 micron as a typical value in crystalline metals) which are separated by weak grain boundaries.

In one embodiment, the present invention relates generally to an article comprising a bulk metallic glass skin, wherein the bulk metallic glass skin comprises one or more functional features integrated therein, wherein the one or more functional features exhibit a variation in stiffness between the one or more functional features and the bulk metallic glass skin, wherein the variation in thickness is defined by an applied force over an achieved deformation, wherein the stiffness of each of the one or more functional features is at least 1000 times less than an average stiffness of the bulk metallic glass skin.

As described herein, the scale of each integrated functional feature is typically in the range of about 100 microns to about 2 cm, preferably in the range of about 1 mm to about 1 cm. Furthermore, it is also necessary that variations in stiffness (force applied on article over achieved deformation) between the integrated functional feature and the skin of the article be at least 1,000 times and in some cases up to 100,000,000 times. In other words, the integrated functional features should have a stiffness defined by applied force (e.g. finger pressure) over the resulting deformation which is at least 1000 times lower than the average stiffness of the article.

The functional features are integrated into the BMG or into the skin of the BMG by utilizing localized thinning methods in which the localized thin sections comprise the functional features. The inventors of the present invention have found that the functional features integrated into a section of the article (or skin of the article) by the methods described herein are very strong and durable due to the homogeneous structure on this length scale, even at feature thicknesses of 30 microns and below.

Thus, a major aspect of the present invention in terms of processing is that the inventors have discovered methods of fabricating BMG parts comprising thin sections (e.g., about 10-300 microns) and relatively thick sections (e.g., about 200 microns-5 mm) precisely located on the article and combined within one article. These fabrication methods have been shown to integrate features which require thin sections and are used very effectively in thermoplastic forming based blow-molding and stretch molding processing methods. In addition, the thinnest sections of the integrated features may have a thickness of between about 1% and about 50% of the thickness of the BMG skin, more preferably a thickness of between about 5% and about 20% of the thickness of the BMG skin. For example, in one embodiment, the skin may have a thickness of about 500 microns and the thinnest sections of the integrated features may have a thickness of about 50 microns (or less).

The fabricating of such thin sections in a precise manner (its location on the article as well as its thickness) is made possible by the surprising finding that once the BMG is in physical contact with the mold, it does not deform (<5%) and deformation (strain, >95%) is limited to those sections in which the BMG is not yet in contact with the mold. Thus, the inventors of the present invention have surprisingly found that it is possible to accurately control thickness by mold design and processing conditions. The use of the strategies describe herein provide controllable conditions for the creation of integrated features in a precise and repeatable manner.

These methods include a local thermoplastic forming operation to eliminate lateral friction, a blow molding forming operation which eliminates friction by undergoing essentially all strain before in contact with the mold and thereby enables such thin sections through avoiding contact during lateral straining, and stretch molding. To a limited extent, compression molding may also be used as shown, for example, in FIG. 2.

Friction between the mold and the forming BMG is important because it provides control over localized thinning so that the integrated feature(s) may be created in a precise and repeatable manner. In the case of blow molding, the friction coefficient is based on the difference between the mold material and the particular BMG. For example, the BMG may be based on titanium, copper, iron, nickel, palladium, zirconium, gold, platinum, calcium, magnesium, tungsten, cobalt and combinations of the following and the mold material may be selected from any material with a strength above about 10 MPa at processing temperature, including for example, metals, various ceramics, plaster of Paris, polymers, PEEK, silicon, oxide glass, among others. Suitable polymers include for example epoxy-based negative photoresists, such as SU-8, and polyaryletherketones, such as polyether ether ketone (PEEK), among others. It is also desirable that the friction coefficient is greater than 1.0.

The integrated functional features described herein all operate in the elastic region and are designed to withstand repetitive, elastic deformation. Therefore stress and strain are limited to the yield strength and elastic strain region, respectively. Examples of such integrated functional features include, but are not limited to, switches, keys, sensors, buttons, hinges, feedthroughs, diaphragms, speakers, etc., all of which may be integrated into the overall article or skin of the article.

Figure 5:
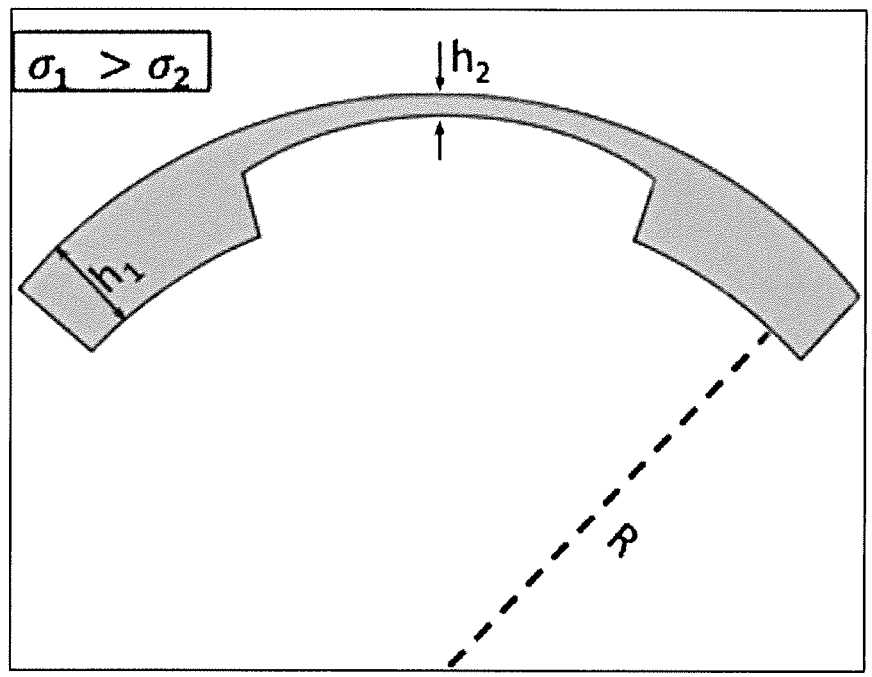
FIG. 5 depicts schematics of a concept used in the practice of the present invention.

One main requirement to achieve this integration is the process of locally thinning the article skin. The thickness is directly translated into stress, e.g. in bending, $\sigma = E\varepsilon = hE/2r$, where $\sigma$ is the stress, $\varepsilon$ the Young's Modulus, e the strain, h the thickness, and r the bending radius (radius of curvature). Thus, by reducing thickness, stresses can be reduced. Based thereon, a larger bending deformation, $1/r$, can be achieved for the same level of stress when reducing the thickness, or for a given stress larger deformation can be achieved. This is demonstrated, for example in FIG. 5. The thickness of the thin section(s) can be controlled through the height h.

Figure 6A:
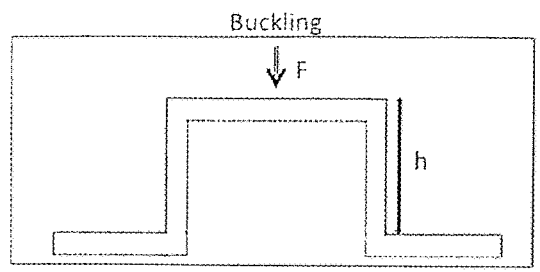
FIGS. 6A, 6B, 6C and 6D depict examples of keys of different force-deformation behaviors.
Figure 6B:
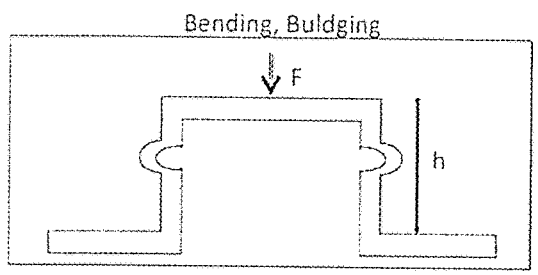
Figure 6C:
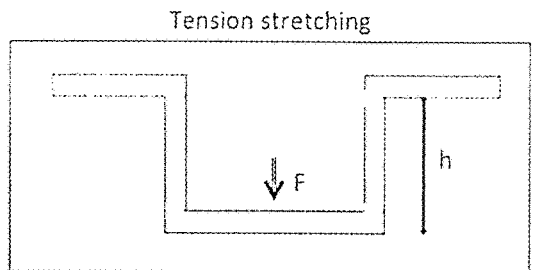

This principle may also be translated into an integrated and sealed key feature, a larger stroke length feature and/or a lower push resistance feature as depicted in FIGS. 11A, 11B, 11C, 11D, 12 and 15 respectively. Local thinning as a strategy to enhance the allowable deformation (before yielding) is most effective when accompanied by design strategies as depicted in FIGS. 6A, 6B and 6C, which provide decreased bending and stretching resistance.

Various strategies may be used to produce the localized thin sections of the BMG that comprises the functional features. Some of these strategies include:
1) blow molding;
2) compression molding;
3) stretch molding; and/or
4) localized application of heat and/or pressure.

In addition, thickness within the localized thin section(s) can be varied and controlled by mold design (thinnest where the material has to deform the most to fill the mold), temperature (thinnest where the materials' temperature is the highest, still below the crystallization temperature), and by the use of a feedstock material having a non-uniform thickness. Thus, the present invention describes methods of achieving and controlling thickness variations within the article, particularly around the integrated functional features to enable localized deformation, as shown in FIGS. 1A, 1B and 1C.

The inventors of the present invention have also surprisingly found that strain can be controlled very locally, to within less than about 20% of the functional feature size, through mold design. The reason for this is that during proposed methods, the BMG when in direct contact with the mold, experiences a friction coefficient in excess of unity, whereas locations that are not in contact with the mold do readily deform with flow stresses on the order of 1 MPa. Thereby, strain can be controlled precisely through mold design; locations that are in contact with mold at some point in time do essentially not deform further (no thinning) whereas locations that are not in contact with the mold readily strain for temperatures in the supercooled liquid region. In the supercooled liquid region, the BMG softens fast but continuously until the crystallization temperature where the BMG crystallizes and can essentially no longer be deformed.

Figures 1B, 1C:
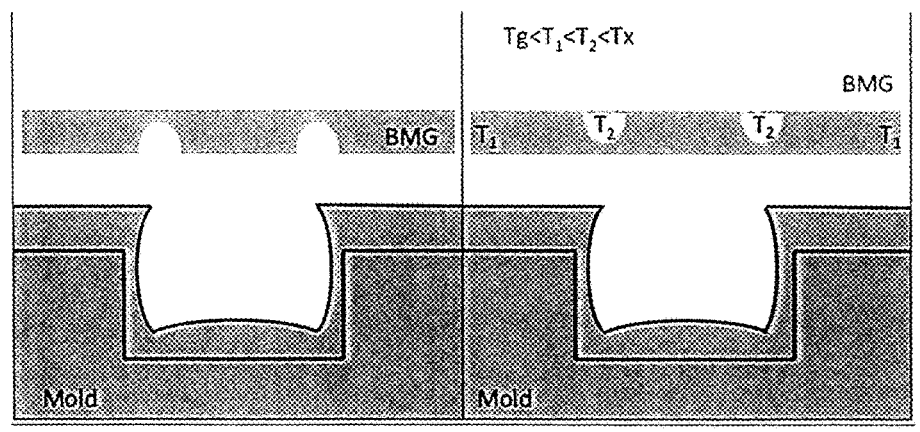

As shown in FIGS. 1A, 1B and 1C, a consequence of this effect for the shown geometry is that the thickness evolves very locally. In the undercuts, the strain is the highest and thus the thickness is the thinnest. At the bottom, the strain is moderate and the thickness is medium. Finally, at the top part, the functional feature underwent the lowest strain, and thus has the thickest walls.

FIGS. 1A, 1B and 1C describes various strategies to vary the thickness of the functional features in which local strain is proportional to 1/thickness. The BMG feed stock is stretched into the mold by the plunger. As set forth in FIG. 1A, in one embodiment, the thickness may be controlled by controlling strain. It is noted that angle α provides an additional tool to define wall thickness and as depicted in the left side of mold shown in a), local stress levels are indicated. As set forth in FIG. 1B, thickness may also be controlled by distribution of feed stock. Finally, as set forth in FIG. 1C, thickness may be controlled through temperature, in which $T_g<T_1<T_2<T_x$, wherein $T_g$ is the glass transition temperature and $T_x$ is the temperature at the onset of crystallization, and wherein the supercooled liquid region is the temperature region between $T_g$ and $T_x$ wherein the bulk metallic glass skin may be manipulated in the manners described herein. In addition, $T_{material}$=at least $T_g \times 1.1$.

The inventors of the present invention also discovered that the most effective methods to create localized thinning due to mold sticking and enhanced strain are blow-molding and stretch molding.

Figure 2:
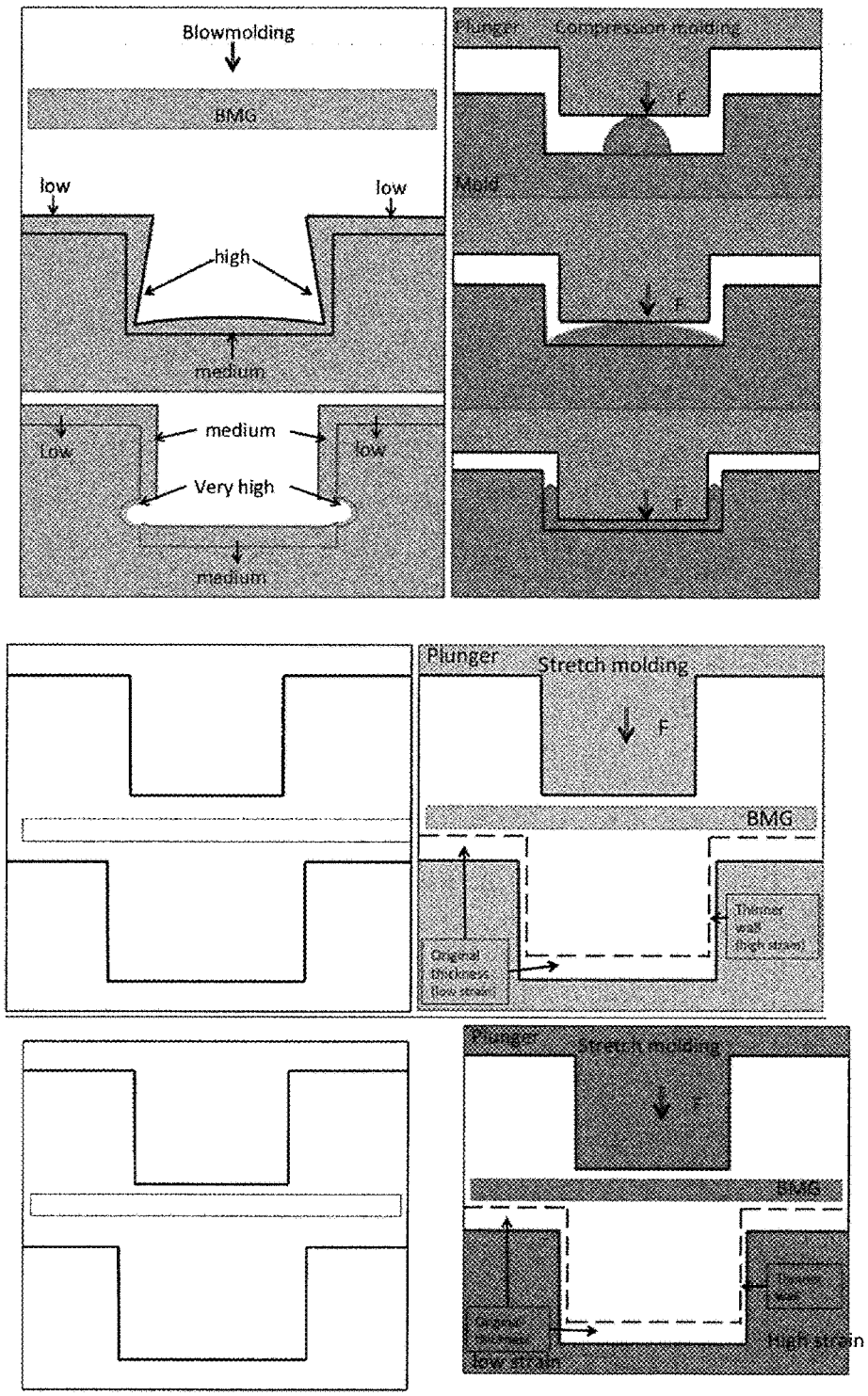
FIG. 2 depicts various methods for achieving variations in thickness, including blow molding, stretch molding and compression molding.

As shown in FIG. 2, variations in thickness can be achieved through (1) blow molding, (2) stretch molding, and (3) in more limited situations, through compression molding. In particular, through blow molding very thin sections can be achieved in regions where there is high strain, and which additionally can be achieved through mold design.

Figure 3:
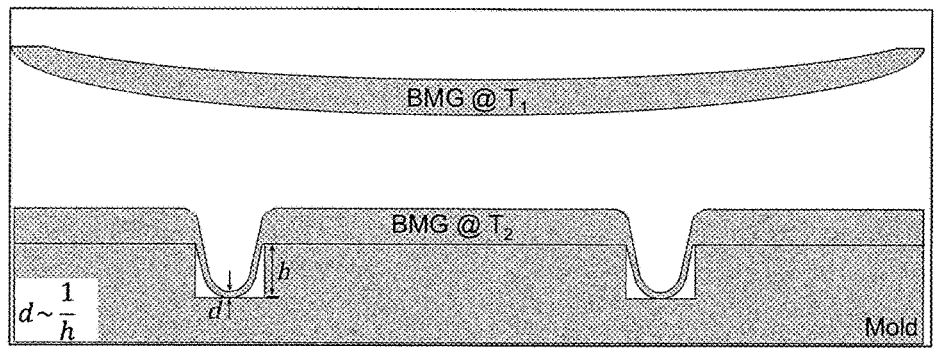
FIG. 3 depicts schematics of the methods to create complex articles with thin sections for integrated keys (and other features) through blow molding.

A two-step processing method may also be used in certain situation in which localized heating and/or localized pressure are applied to locally thin sections in the BMG article. For example, thin sections can also be achieved through a local application of pressure or heat as set forth in FIG. 3. However, the use of localized heating as a fabrication technique is only suitable in situations where the coefficient of friction is very high.

In a more general sense, temperature can be used to control strain locally as seen in FIGS. 1A, 1B and 1C and FIG. 3. Because the flow stress of a BMG (or the corresponding viscosity) is a strong function of temperature, small temperature changes, for example in the range of about one order of magnitude change in viscosity or flow stress, can be achieved by changing temperature by ~15° C. Thus, through local temperature variations the inventors have found that it is possible to control the deformation of the BMG and thereby create thin sections as well as localized thinning within the thin sections.

The inventors have also found that it is possible to control the thickness distribution by using a non-uniform thickness feedstock material as seen in FIG. 1B. This effect is most efficient in the blow molding fabrication where the non-uniform thickness distribution is amplified during the blow molding process.

Compression molding may be used in situations in which smaller thickness variations and/or short thin regions are required with respect to the integrated features. For example, thin sections of integrated features such as buttons may be achieved through compression molding. The limitations in fabricating thin sections by compression molding include: (1) the thinness of the sections; (2) the length of the sections; (3) the thinness of the thin section in comparison with the thickness of the thicker sections; and (4) how much BMG has to flow through the thin section for a given molding process and geometry.

Figure 4:
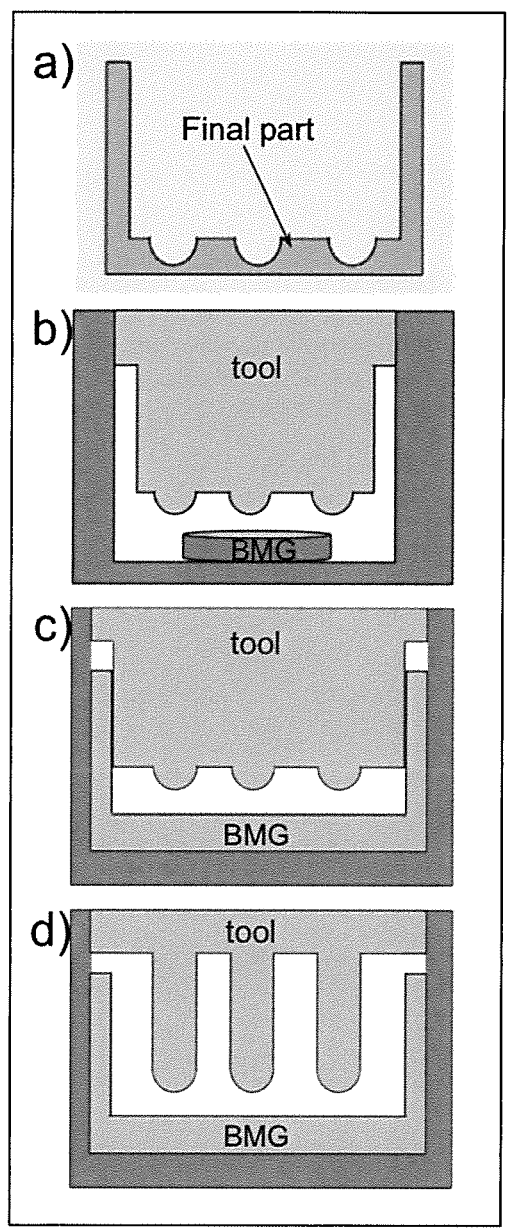
FIG. 4 depicts an example of compression molding using a pre-form to reduce flow requirements through thin sections.

FIG. 4 depicts an example of compression molding using a pre-form to reduce flow requirements through thin sections. Complex shapes that comprise of thin section (a) for the integration process can also be fabricated through TPF based compression molding. However the shape in (a) cannot be fabricated with the method shown in (b) since it requires significant lateral flow of the material through the thin sections. When used a pre-form as shown in (c) through a secondary operation, the lateral required strains are dramatically reduced and the shape in (a) can be fabricated. Alternatively local TPF based forming can be used to minimize friction for the lateral movement (the material can also go in perpendicular direction).

Figure 7:
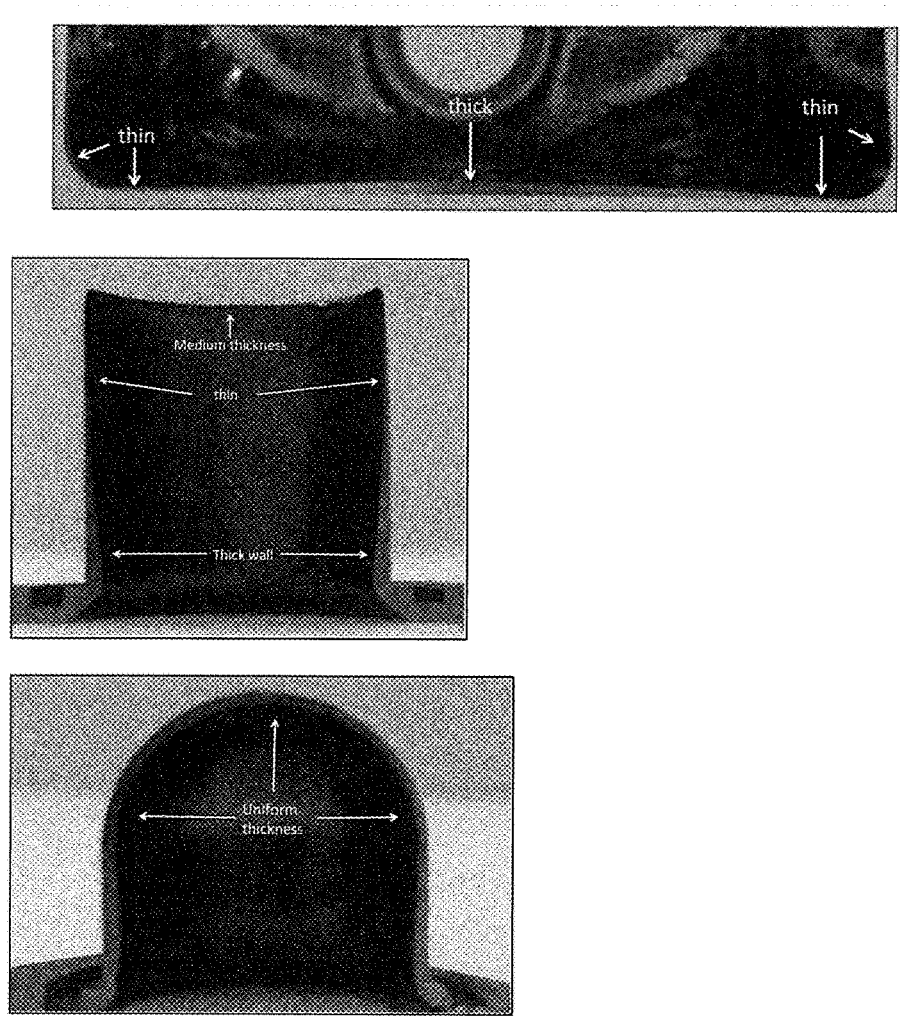
FIG. 7 depicts cross-sectional views of metallic glass features integrated into the skin of a bulk metallic glass article.
Figure 8:
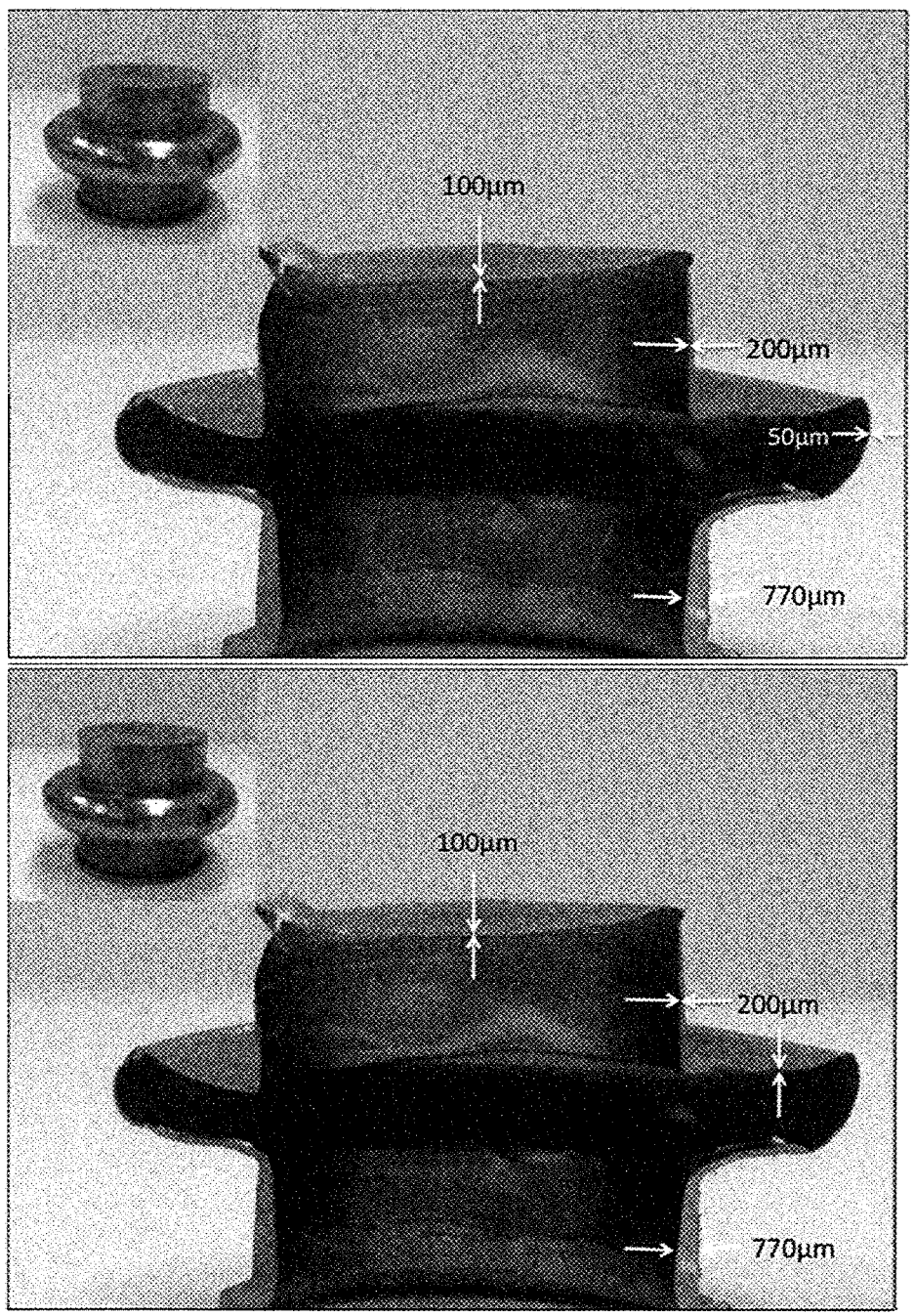
FIG. 8 depicts cross-sectional views of a metallic glass key fabricated through thermoplastic forming based blow-molding.

It is also noted that functionality of the integrated features is not achieved through compression or tension stretching alone. In fact, compression molding or tensile stretching of straight sections is very ineffective as shown in FIG. 7, which depicts various cross-sectional views of BMG functional features integrated into an article. Here the deformation is limited to the elastic strain limit, e.g. a 5 mm tall switch could only be deflected by 100 micron. Thus, the present invention also relies on bending deformation and or buckling as shown in FIG. 8. Most effective is bending/bulging followed by buckling. In pure stretching the elastic stroke is limited to 2% of the height of the button. However, the inventors of the present invention have found that in bending, the achievable elastic deformation is approximately 50 times the inverse of the thickness of the sample. Thus, the inventors have found that large elastic bending can be achieved in thin BMG samples. The invention described herein also comprises geometries in which stresses from deformation are smaller than the yield strength of the BMG used.

In another embodiment, the present invention relates generally to a method of fabricating an article comprising a bulk metallic glass skin and one or more functional features integrated therein, the method comprising the steps of:
  a) providing a bulk metallic glass skin; and
  b) locally thinning one or more portions of the bulk metallic glass skin to create one or more functional features therein;
wherein the one or more functional features exhibit a variation in stiffness between the one or more functional features and the bulk metallic glass skin;
wherein the variation in thickness is defined by an applied force over an achieved deformation,
wherein the stiffness of each of the one or more functional features is at least 1000 times less than an average stiffness of the article.

In one preferred embodiment, fabrication of the article and the one or more functional features is carried out in the same processing step, and the processing step does not exceed a crystallization time of the bulk metallic glass. In another preferred embodiment, fabrication of the article and the one or more functional features is carried out sequentially, and the cumulative processing time does not exceed a crystallization time of the bulk metallic glass.

Figure 6D:
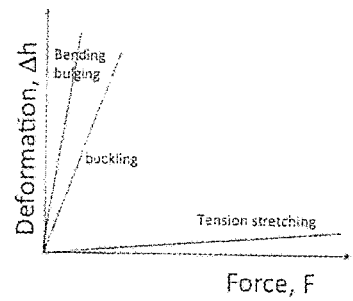

FIGS. 6A, 6B and 6C depicts examples of keys of different force-deformation behaviors. In the bending design depicted in FIG. 6B, a larger change in height is achieved for same force than in the buckling design shown in FIG. 6A. Elastic deformation in buckling and bending is also much higher than in tension stretching which is depicted in FIG. 6C. FIG. 6D provides a schematic of force-deformation behavior for bending, buckling and tension stretching.

The integration of functional features into the skin of a BMG article in the manner described herein has been found to provide high strength even in very thin sections. In addition, the BMG fatigue behavior (number of repetitions) for the particular low stresses created in the BMG integrated features is also very high.

The strategies described herein have been shown to be applicable to the following applications, among others:
(1) Integration of keys into the skin of an article, as shown in FIGS. 11A, 11B, 11C and 11D.

FIGS. 11A, 11B, 11C and 11D depict schematics of the concept of utilizing the reduced thickness to enable stroke of a soft key. In 11A and 11B, only small stroke length are possible. In 11C and 11D, larger stroke lengths are possible due to the geometry of the thin section.

The integration of keys in this manner enables the development of novel designs and allows for miniaturization. In addition, the integration of keys into the skin of the article also makes the resulting article waterproof or more non-permeable. FIG. 8 depicts cross-sectional views of a metallic glass key which was fabricated through thermoplastic forming based blow-molding. Through processing conditions and mold design the thickness distribution can be controlled as described in FIG. 2.

Figure 9:
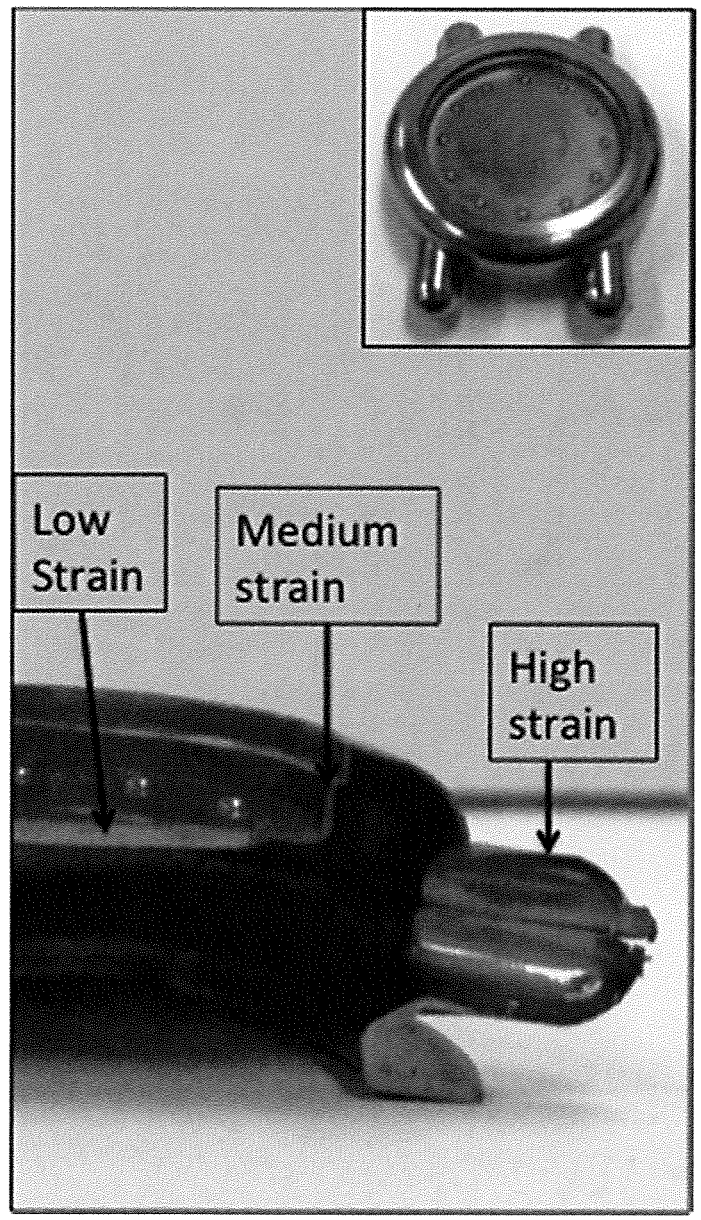
FIG. 9 depicts a key integrated into the skin of a watch-case.
Figure 10A:
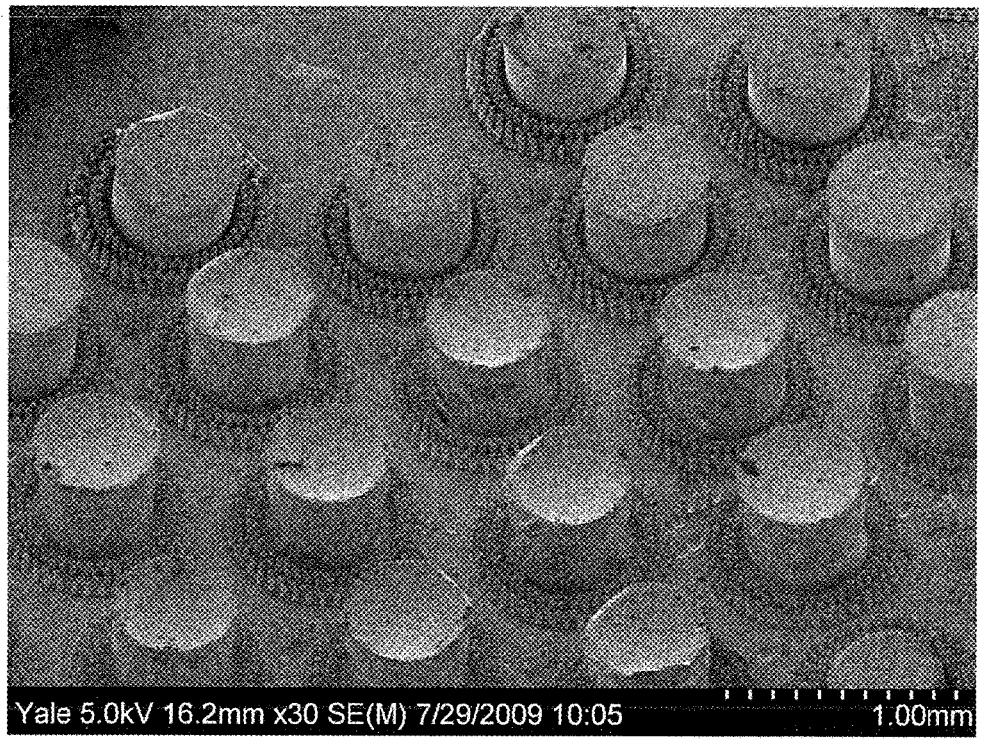
FIGS. 10A, 10B and 10C depict a key array integrated into a metallic glass skin of various stroke length and height.
Figure 10B:
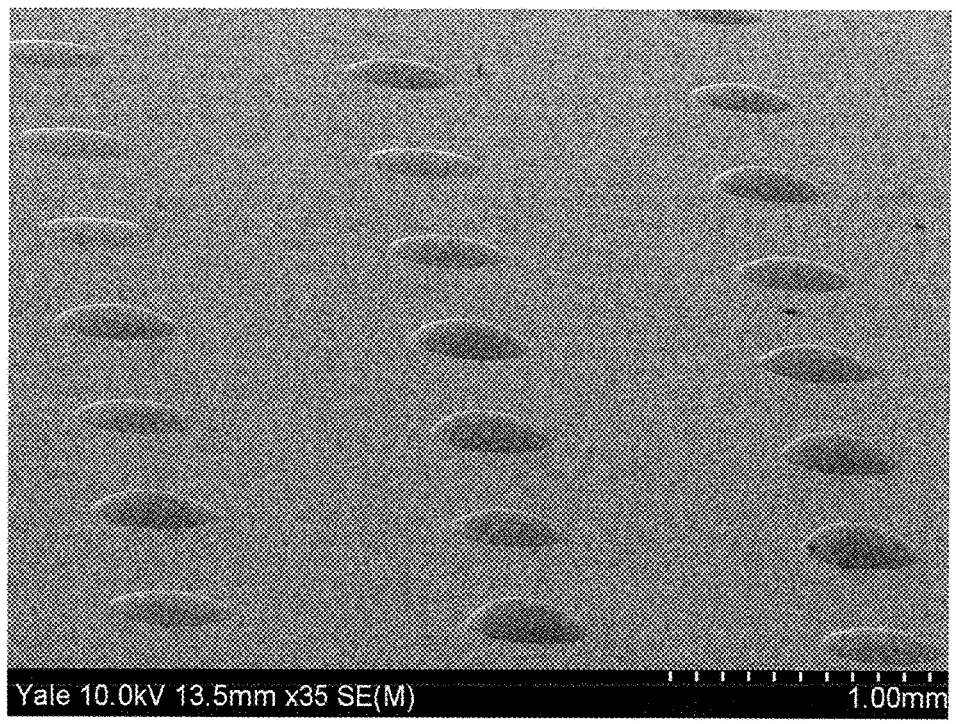
Figure 10C:
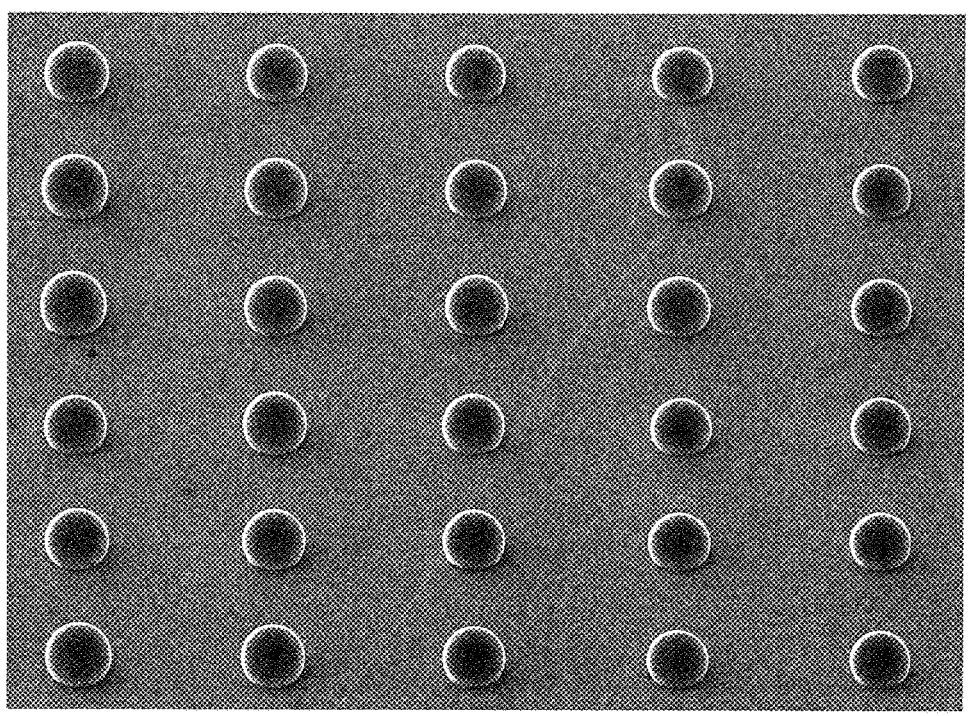
Figure 11A:
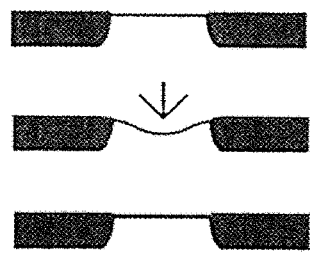
FIGS. 11A, 11B, 11C and 11D depict schematics of the concept of utilizing the reduced thickness to enable stroke of a soft key. In 11A and 11B, only small stroke length are possible. In 11C and 11D, larger stroke lengths are possible due to the geometry of the thin section.
Figure 11B:
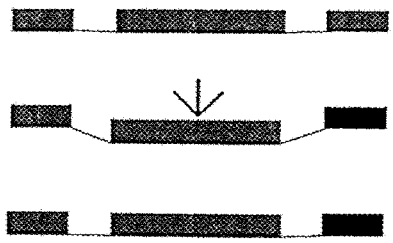
Figure 11C:
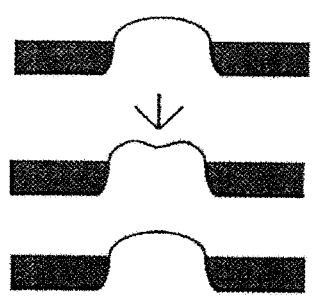
Figure 11D:
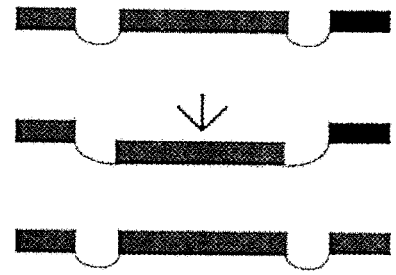

Additional specific examples include, but are not limited to, keyboards, as depicted in FIGS. 10A, 10B and 10C and FIG. 13, watch cases, as depicted in FIG. 9, and keypads. Furthermore, functional features produced by the method described herein can be used as sensors, such as for sensing pressure, temperature, or acceleration. In addition, FIG. 9 clearly depicts localized thin sections (high strain areas) as well as areas of medium strain and low strain.

Figure 14:
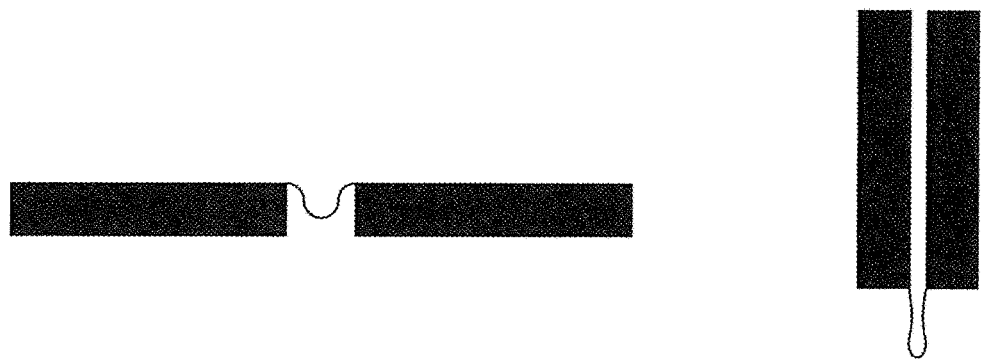
FIG. 14 depicts the utilization of the reduced stress concept for flexure bearings and living hinges.

(2) Integrated flexure bearings or living hinges, as shown in FIG. 14.

The use of BMGs in this manner enables the fabrication of novel designs. For example, a casing and hinge may be made of one material. Collapsible and inflatable structures can also be included through integration through flexure bearings. This allows for the fabrication of structures that are unfolding, (i.e., inflatable, expanding) from a small volume to a large final volume, all in an elastic manner. This is important for biomedical tools, implants and devices, for space transport and other applications that must be capable of repeatably and reliably folding and unfolding.

As discussed above, high stroke length features such as bellows for pressure sensing and vacuum feedthroughs. were previously fabricated by welding the bellow or vacuum feed through to the article, which can cause breakage upon repeated use. Using the processes described herein to fabricate the high stroke length feature results in greater reliability and repeatability.

Figure 15:
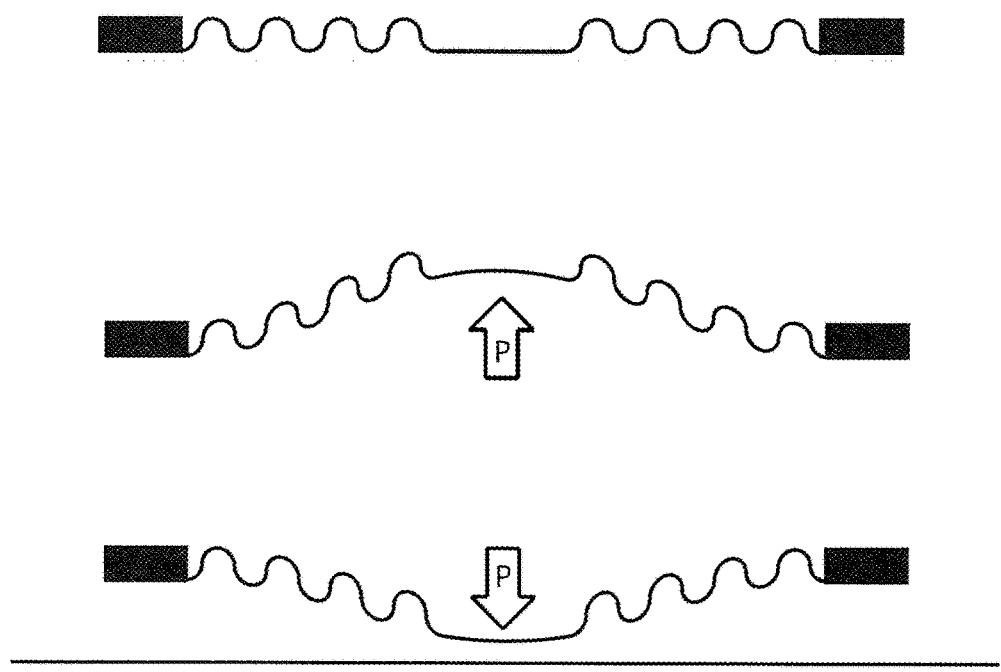
FIG. 15 depicts the utilization of the reduced stress concept for diaphragms.

(3) Integrated diaphragms, as shown in FIG. 15.

Applications for integrated diaphragms include, but are not limited to speakers, particularly tweeters, and adjustable mirrors.

Figure 12:
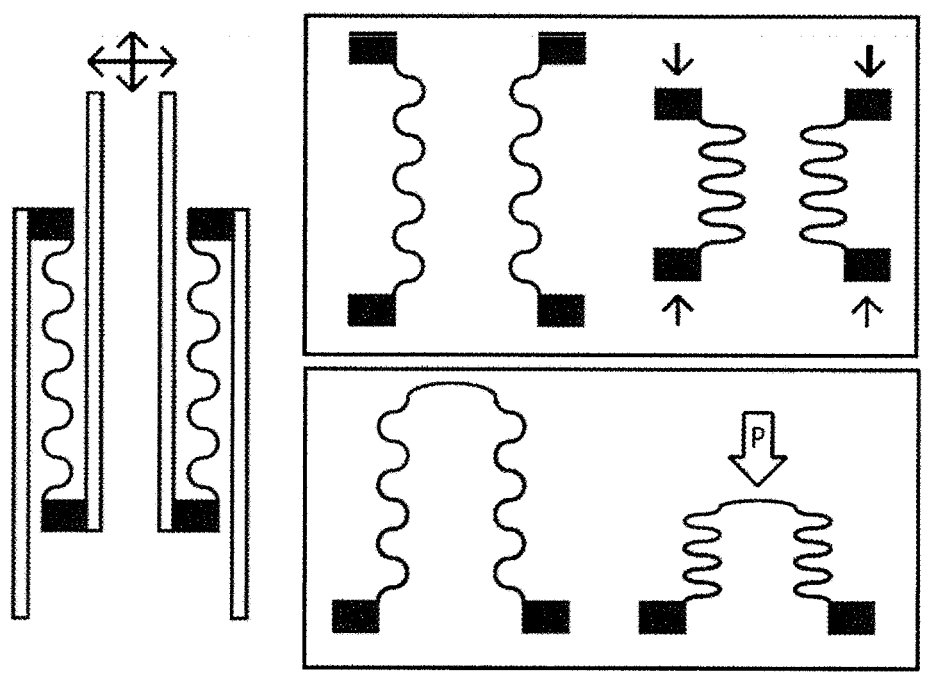
FIG. 12 depicts using the reduced stress concept (bending, bulging) for high stroke length integrated features such as integrated and seamless bellows for pressure sensing, and vacuum feedthroughs.
Figure 13:
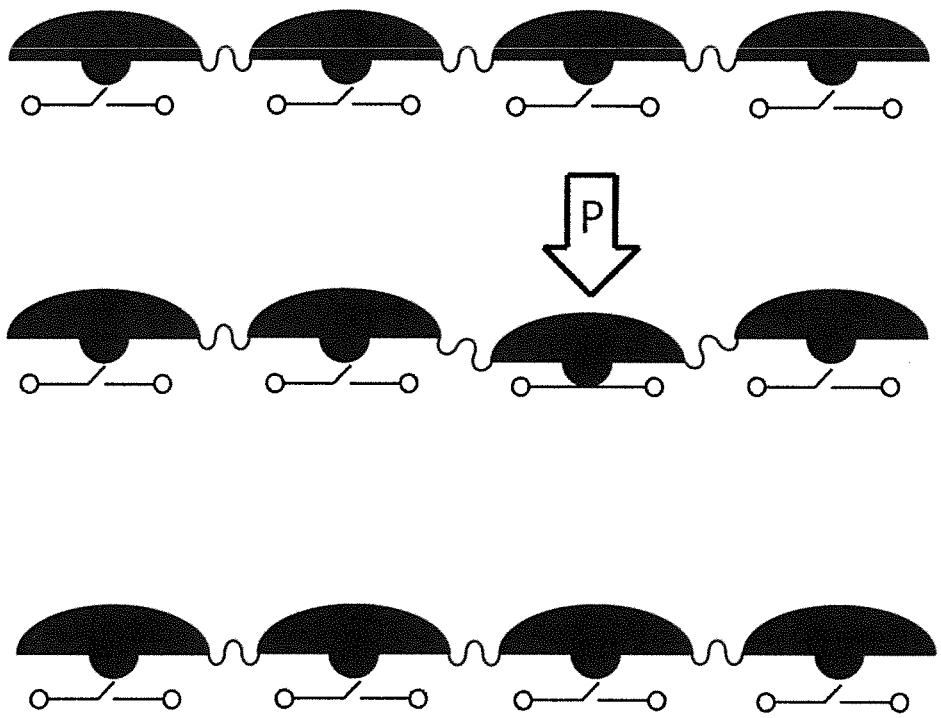
FIG. 13 depicts a key pad based on the reduced stress concept.

(4) Integrated bellows as shown in FIG. 12.

The integrated bellows are vacuum-sealed, waterproof, non-permeable bellows designs for which vacuum feedthroughs may be fabricated, and may also include actuators, vibrational tolerant seals, and sensors with longer stroke length, among others.

Thus, as described herein, functional features can be integrated into a BMG article by a range of methods depending on the desired properties of the features.

It should also be understood that the following claims are intended to cover all of the generic and specific features of the invention described herein and all statements of the scope of the invention that as a matter of language might fall there between.

What is claimed is:

1. An article comprising a bulk metallic glass skin, wherein the bulk metallic glass skin comprises one or more functional features integrated therein, the one or more functional features each comprising sidewalls connected to a top surface,
  wherein the one or more functional features each comprise one or more localized thin sections molded into the sidewalls of the bulk metallic glass skin at predefined positions and wherein the one or more localized thin sections in the sidewalls are configured to bend, bulge or buckle upon application of an applied force,
  wherein each of the one or more functional features exhibits a variation in stiffness with the bulk metallic glass skin to allow the one or more localized thin sections in the sidewalls to bend, bulge or buckle upon application of the applied force,
  wherein the variation in stiffness is defined by the applied force over an achieved deformation, and
  wherein the stiffness of each of the one or more functional features is at least 1000 times less than an average stiffness of the bulk metallic glass skin.

2. The article according to claim 1, wherein the functional features are selected from the group consisting of keys, buttons, switches, sensors, keyboards, keypads, and large stroke features.

3. The article according to claim 1, wherein the stiffness of the functional features is controlled by at least one of thickness and feature design.

4. The article according to claim 1, wherein a thickness of the localized thin sections is between about 1% and about 50% of the thickness of the bulk metallic glass skin.

5. The article according to claim 4, wherein the thickness within the localized thin sections is between 10% and 20% of the thickness of the bulk metallic glass skin.

6. The article according to claim 1, wherein a thickness within the localized thin sections varies within the localized thin section to enable localized deformation within the localized thin section.

7. The article according to claim 6, wherein the localized deformation within the localized thin section is capable of at least one of bending, bulging or buckling at the point of the localized deformation.

8. The article according to claim 6, wherein a thinnest section of the localized thin section exhibits a high strain and a thickest section of the localized thin section exhibit a lower strain during deformation.

9. A method of fabricating an article comprising a bulk metallic glass skin, wherein the bulk metallic glass skin comprises one or more functional features integrated therein, the one or more functional features each comprising sidewalls connected to a top surface, the method comprising the steps of:
a) providing a bulk metallic glass skin; and
b) locally thinning one or more portions of the bulk metallic glass skin to create one or more functional features therein, wherein the step of locally thinning the one or more portions of the bulk metallic glass skin comprises molding one or more functional features each comprising one or more localized thin sections into the sidewalls of the bulk metallic glass skin at predefined positions, and wherein the one or more localized thin sections in the sidewalls are configured to bend, bulge, or buckle upon application of an applied force;
wherein each of the one or more functional features exhibits a variation in stiffness with the bulk metallic glass skin to allow the one or more localized thin sections in the sidewalls to bend, bulge or buckle upon application of the applied force;
wherein the variation in thickness is defined by the applied force over an achieved deformation, and
wherein the stiffness of each of the one or more functional features is at least 1000 times less than an average stiffness of the bulk metallic glass skin.

10. The method according to claim 9, wherein fabrication of the article and the one or more functional features is carried out in the same processing step, and
wherein the processing step does not exceed a crystallization time of the bulk metallic glass.

11. The method according to claim 9, wherein fabrication of the article and the one or more functional features is carried out sequentially, and
wherein the cumulative processing time does not exceed a crystallization time of the bulk metallic glass.

12. The method according to claim 9, comprising the step of forming the bulk metallic glass skin by heating a bulk metallic glass forming composition into a supercooled liquid region of the bulk metallic glass forming composition and forming the bulk metallic glass forming composition into the bulk metallic glass skin under an applied pressure.

13. The method according to claim 9, wherein the step of molding the bulk metallic glass skin comprises at least one of blow molding, compression molding and stretch molding of the bulk metallic glass skin.

14. The method according to claim 13, wherein the step of molding the bulk metallic glass skin comprises blow molding;
wherein the bulk metallic glass skin essentially does not deform once it is in physical contact with a mold; and
wherein localized thin section are formed in the one or more portions of the bulk metallic glass skin in which the bulk metallic glass skin is not in contact with the mold.

15. The method according to claim 9, wherein the functional features are selected from the group consisting of keys, buttons, switches, sensors, keyboards, keypads, and large stroke features.

16. The method according to claim 9, wherein a thickness within the localized thin sections is between about 1% and about 50% of the thickness of the bulk metallic glass skin.

17. The method according to claim 16, wherein the thickness within the localized thin sections is between about 10% and about 20% of the thickness of the bulk metallic glass skin.

18. The method according to claim 9, wherein the step of locally thinning the one or more portions of the bulk metallic glass skin further comprises the step of varying or controlling the thickness within the localized thin section to enable localized deformation within the localized thin section.

19. The method according to claim 18, wherein the thickness within the localized thin section is varied or controlled by mold design;
wherein the bulk metallic glass skin is thinnest at a point where the bulk metallic glass has to deform the most to fill the mold.

20. The method according to claim 18, wherein the thickness within the localized thin section is varied or controlled by using a bulk metallic glass feedstock material having a non-uniform thickness.

21. The method according to claim 18, wherein the thickness within the localized thin section is varied or controlled by local temperature variations;
wherein the bulk metallic glass skin is thinnest at a point where the temperature of the bulk metallic glass skin is the highest but still below a crystallization temperature of the bulk metallic glass.

22. The method according to claim 21, wherein the temperature is varied by about 15° C. to control the thickness of the localized thin section.

23. The method according to claim 14, wherein strain is controlled through mold design, wherein portions of the bulk metallic glass skin readily strain for temperatures in a supercooled liquid region of the bulk metallic glass; and
wherein within the supercooled liquid region, the bulk metallic glass skin softens rapidly and continuously until a crystallization temperature, whereby the bulk metallic glass skin crystallized and can no longer be deformed.

24. The method according to claim 18, wherein the localized deformation within the localized thin section is capable of at least one of bending, bulging or buckling at the point of the localized deformation.

25. The method according to claim 18, wherein thinnest sections of the localized thin section undergo a high strain and thickest sections of the localized thin section undergo a lower strain.

* * * * *